June 19, 1951 — C. R. MINER — 2,557,752

PHONOGRAPH PICKUP MOUNTING

Filed July 21, 1949

Inventor:
Carroll R. Miner,
by Merton D. Morse
His Attorney.

Patented June 19, 1951 2,557,752

UNITED STATES PATENT OFFICE 2,557,752

PHONOGRAPH PICKUP MOUNTING

Carroll R. Miner, Liverpool, N. Y., assignor to General Electric Company, a corporation of New York Application July 21, 1949, Serial No. 106,007

2 Claims. (Cl. 179—100.41)

Figure 1:
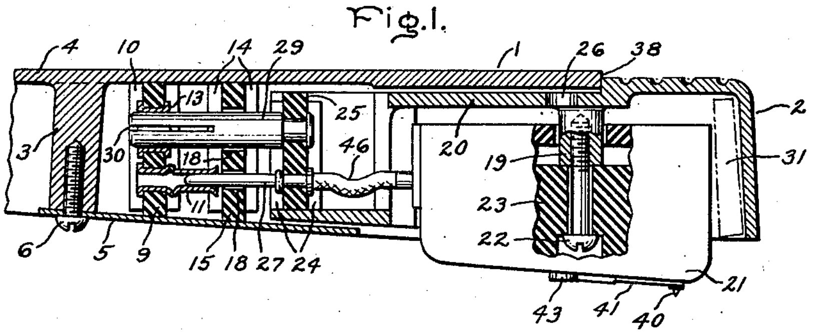

My invention relates to a tone arm assembly and, more particularly, to a tone arm assembly which is provided with a removable transducer unit. While my invention is of general utility, it is particularly adapted for use in connection with phonographs which are adapted to reproduce both records of standard groove size and the narrow groove, or long playing, phonograph records.

In order to provide a phonograph which will play both conventional or standard size groove records and the more recent long playing records, wherein the groove size is considerably smaller, it is necessary to make substantial modifications in conventional reproducing equipment. First, the turntable speed must be reduced so that the playing time is increased. Second, a smaller size reproducing stylus must be used so as to fit into the smaller grooves of the long playing records; and thirdly, the stylus pressure must be reduced when playing narrow groove records so as to reduce wear on the record, and the like.

While various phonograph arrangements have been proposed to accommodate both the playing of conventional records and narrow groove records, these arrangements generally require the use of special transducer units and operating levers which adjust the pressure with which the stylus bears upon the record. To obviate the use of such pressure adjustments and needle changing apparatus, I provide a plug-in type transducer unit. The transducer unit may be removed from the tone arm and a substantially similar unit with a different size reproducing stylus and a different weight may be substituted therefor, so that proper operation with any record of given groove size is obtained. Accordingly, it is a primary object of my invention to provide a new and improved tone arm assembly which is adapted to play either standard size groove records or narrow groove records.

It is a further object of my invention to provide a new and improved tone arm assembly in which plug-in type transducer units may be selectively employed so that standard groove records or narrow groove records may be reproduced.

It is another object of my invention to provide a new and improved plug-in type tone arm assembly in which the electrical connections of the assembly are protected in use and during insertion or removal of the component parts of the tone arm assembly.

It is a still further object of my invention to provide a new and improved tone arm assembly in which plug-in type transducer units may be selectively employed so as to reproduce standard groove records or narrow groove records, the transducers of individual transducer units being identical except for different size reproducing styli.

Briefly, in accordance with one phase of my invention, I provide an open ended channel-shaped tone arm which is adapted to receive a similarly shaped transducer housing. The transducer housing is provided with an interlocking pin and a pair of electrical contact plugs which engage complementary members positioned within the tone arm when the transducer housing is inserted therein. A protective cross-member is positioned between the electrical receptacles within the tone arm and the open end of the tone arm so as to prevent accidental contact with the receptacles during insertion and removal of the transducer housing. The interlocking pin is of split construction so that a wedging action is accomplished when the transducer housing is inserted into the tone arm thereby securing the same in operative position therewithin. In a particular embodiment, the housing is provided with a central aperture so that the stylus of the transducer which is positioned within the transducer housing may be removed in the event that such transducer is provided with a removable stylus construction.

Figure 2:
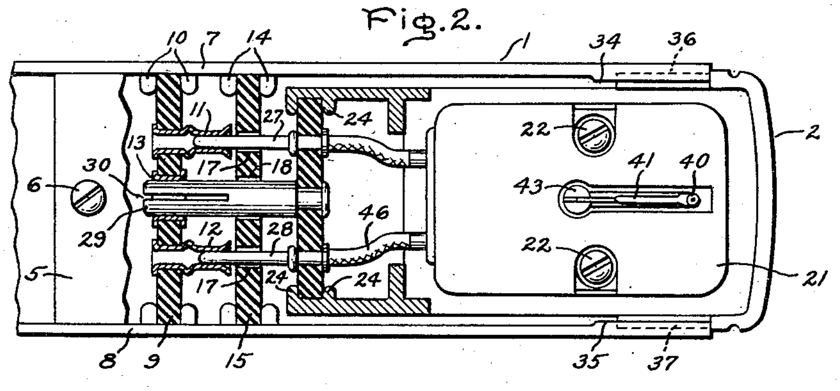
Figure 3:
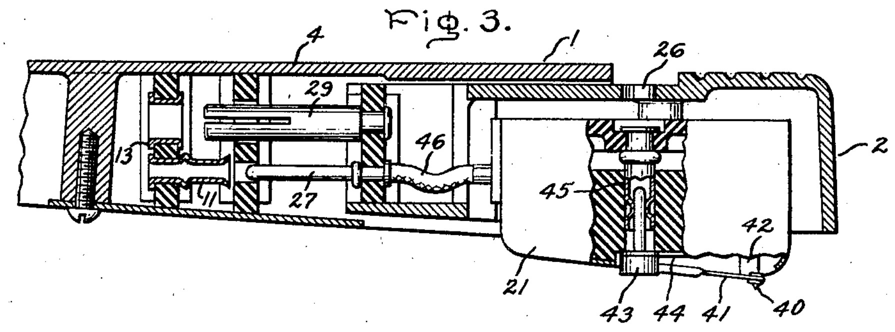

The novel features which are considered to be characteristic of my invention are set forth with particularity in the appended claims. My invention itself, both as to its organization and method of operation, together with further objects and advantages thereof, may best be understood by reference to the following description taken in connection with the accompanying drawing, wherein Fig. 1 is a side elevation view of the tone arm assembly taken in sections with portions of the transducer unit broken away to illustrate the way in which the transducer is mounted within the transducer housing; Fig. 2 is a bottom view of the tone arm assembly with portions thereof broken away to show the plug-in features of the transducer unit; and Fig. 3 is a side elevation view which is similar to Fig. 1 except the transducer unit is shown in partially withdrawn position.

Referring to Fig. 1, the tone arm assembly is therein illustrated as comprising interfitting male and female members, the female member comprising an open ended channel-shaped tone arm indicated generally at 1, which may be of molded plastic construction, and the male member comprising a channel-shaped transducer housing, indicated generally at 2, which may also be of molded plastic construction. The tone arm is provided with an integral, centrally located stud 3 which extends downwardly from the top wall 4 of the tone arm, and which supports a cover or shield plate 5 thereupon. The cover plate 5 is secured to the stud 3 by means of a screw 6, which may be threaded into the stud. The top wall 4 and the side walls 7, 8 of the tone arm, together with cover plate 5, serve to define a chamber into which the transducer housing 2 may be placed.

Each of the side walls 7, 8 of the tone arm is provided with a series of inwardly extending flange portions 10 which define a groove which is adapted to receive the edge of a terminal support member 9. Support member 9, which may be of any suitable insulating material, is provided with a pair of spaced electrical receptacles 11, 12 and is also provided with a metallic sleeve-like receptacle 13 which is adapted to receive the interlocking pin on the removable transducer unit. Each of the side walls 7, 8 of the tone arm is also provided with a pair of inwardly extending flange portions 14, which define a groove therebetween which is adapted to receive a transverse member 15, also of suitable insulating material. Transverse member 15 acts as a centering means for the plug-in unit and is provided with apertures 16, 17 for the contact pins of the removable transducer unit and an aperture 18 which acts as a guide for the interlocking pin of the transducer unit.

By such construction, the electrical receptacles 11, 12, one of which is commonly connected directly to one side of the power line in A. C.-D. C. type phonograph reproducing apparatus, are shielded both by the cover plate 5 and the transverse member 15 so as to eliminate completely any accidental touching of the electrical receptacles during the insertion and removal of the transducer housing from within the tone arm.

The removable transducer unit comprises the transducer housing 2, which is provided with a pair of bosses 19 which are integral with the housing and extend downwardly from the top wall 20 thereof. The bosses 19 provide a seat for a transducer unit 21, which is mounted within the transducer housing 2. As illustrated in the cut-away portion of the transducer unit in Fig. 1, the bosses 19 are threaded to receive screws 22 which extend through the base portion 23 of the transducer unit and are threaded into the bosses 19, the bosses being of sufficient diameter to provide a substantial seat for the transducer unit. The transducer housing is provided with opposed pairs of inwardly extending flanged portions 24 at the rear end of the transducer housing, these portions defining a groove which is adapted to receive a removable end wall 25, which may be of any suitable insulating material. The top wall 20 of the transducer housing is also provided with an aperture 26 as will be discussed more fully hereinafter. The end wall 25 provides a support for electrical contact plugs 27, 28 and an interlocking pin 29. The electrical contact making plugs 27, 28 and interlocking pin 29 may be secured to the end wall 25 by riveting the same therein or by any other convenient means. The unsupported end of interlocking pin 29 is provided with slots 30 so as to provide fingers thereon which may be squeezed together when the pin is inserted into the complementary sleeve member 13, thereby providing a gripping action on the interlocking pin 29 so that the transducer housing is relatively fixed in operative position within the tone arm 1. As will be apparent from the drawing, interlocking pin 29 projects beyond the electrical plug members 27, 28 so that the plugs are protected when inserting them into their respective receptacles 11, 12.

To provide additional mass for certain of the plug-in type transducer units, there is provided a metal plate 31 of substantial mass, which is mounted vertically in the nose of the transducer housing 2, the plate 31 being held in this position by any convenient means such as by screws through the top and side walls of the housing or the like. In the event additional mass is needed, transducer housings for standard groove records may be constructed of zinc and transducer housings for narrow groove records may be constructed of aluminum to obtain the desired weight differential. Inasmuch as the plate 31 is only provided in certain of the plug-in type transducer units, as will be discussed more fully hereinafter, the plate has been indicated in dotted outline in the drawing.

Referring now to Fig. 2 of the drawing, there is therein illustrated the construction of the transducer housing and the way in which the housing is supported within the tone arm. In order that the interlocking pin 29 and the contact plugs 27, 28 do not provide the sole support of the transducer housing, there is provided along the bottom edge of the side walls 7, 8 of the tone arm, a pair of inwardly extending flanges 34, 35. The front end of the transducer housing is somewhat wider than the distance between the flanges 34, 35 so as to define runner portions 36, 37 in the transducer housing. The housing may thus be supported by and slid along the flanges 34, 35 formed in the tone arm. It should be noted that whereas the top wall of the tone arm is terminated at the surface 38 (as illustrated in Fig. 1) to provide a stop for the transducer housing and also to show the ornamental grooves 39 which are formed in the top of the transducer housing, the side walls 7, 8 of the tone arm extend forwardly of the point 38 to provide the flange portions 34, 35 which support the transducer housing, as has been discussed above. In this connection it will be remembered that Fig. 2 is a bottom view of the tone arm assembly and therefore the runner portions 36, 37 of the transducer housing appear in dotted outline therein.

In Fig. 3 the transducer housing is illustrated as being withdrawn to a point which allows the centrally located aperture 26 in the top wall of the transducer housing to be accessible beyond the top wall 4 of the tone arm. The transducer 21 shown in Fig. 3 is provided with a removable plug supported stylus, the aperture 26 being positioned over the stylus so that an implement may be inserted through the aperture 26 and force the plug supported stylus from within the transducer 21. By virtue of this feature of the invention, the same transducer unit may be utilized for playing different types of records, the reproducing styli being merely interchanged therefor. In this case any convenient means may be used to counterbalance the tone arm assembly. The removable stylus feature is also convenient to allow replacement of worn out styli without interchanging the complete transducer unit. It will be noted that the transducer housing is supported in the partially withdrawn position of Fig. 3 by means of the flange portions of the side walls tone arm 34, 35, as has been fully discussed in connection with Fig. 2.

An interchangeable stylus type transducer is described and claimed in my joint patent application Serial No. 18,648, filed April 2, 1948, now Patent No. 2,554,208, granted May 22, 1951, and assigned to the same assignee as my present invention. Considering briefly the construction of the interchangeable stylus transducer, there is provided a reproducing jewel 40 which is adapted to engage a given size of record groove, and which is supported in vibrating armature member 41. Armature 41 vibrates between pole pieces 42 and produces electrical currents proportional to the amplitude of vibration thereof in armature coils which are not shown in the drawing. Armature 41 is secured to a plug member 43, there being a locking member 44 which is secured to plug 43 so that the same cannot be rotated. The plug 43 fits into a receptacle 45, the receptacle 45 being accessible from the top of the transducer unit so as to allow ejection of the plug supported stylus, as has been discussed above.

It will be apparent that electrical connection from the armature coils of the transducer unit 21 is made through lead wires 46 to the male contact plugs 27, 28. The plugs 27, 28 in turn engage the receptacle members 11, 12 and lead wires (not shown) to the amplifier associated with the phonograph may be conveniently secured in electrical contact with contact members 11, 12 by soldering or the like.

While I have indicated the plug-in type transducer unit as employing a replaceable stylus type transducer, so that worn out styli may be conveniently replaced, it is obvious that any type of transducer may be mounted equally well within the transducer housing and satisfactory operation may be obtained, it being only necessary that the transducers are provided with different size reproducing styli so as to reproduce records of different groove sizes.

From the foregoing, it is seen that the invention makes it possible to reproduce records of different groove sizes by employing a plug-in type transducer unit. If it is desired to play narrow groove records a transducer having a suitable reproducing stylus is plugged into the tone arm, the combined weight of the tone arm and transducer unit providing the required stylus pressure for narrow groove records. In the event that conventional records of relatively large groove size are to be played, a transducer having a suitable reproducing stylus and having additional mass in the form of a plate mounted within the transducer housing, is plugged into the tone arm. The combined weight of the tone arm and modified plug-in unit is sufficient to provide the required stylus pressure necessary for conventional records. With this arrangement, standard transducers may be utilized for both types of plug-in transducer units instead of having special transducers for each type of record and complicated stylus pressure changing apparatus. The particular construction disclosed provides the additional feature of allowing the reproducing stylus of a particular plug-in unit to be replaced without removing the unit from within the tone arm.

While the invention has been described by reference to a particular embodiment thereof, it will be understood that numerous modifications may be made by those skilled in the art without departing from the invention. I therefore aim in the appended claims to cover all such equivalent variations as come within the true spirit and scope of my invention.

What I claim as new and desire to secure by Letters Patent of the United States is:

1. In a phonograph tone arm assembly, the combination of telescoping male and female members, said male member comprising a channel-shaped transducer housing and said female member comprising an open-ended channel-shaped tone arm, said male member being supported within said female member for relative axial movement, a plurality of electrical contacts positioned in each of said members and adapted for engagement when said members are axially interfitted, a transducer positioned within and supported by said transducer housing, means providing a transverse recess in said transducer, said recess having a transverse opening aligned with a corresponding opening in said transducer housing, a plug arranged to be frictionally retained within said recess, and a reproducing stylus supported by said plug, said respective openings being arranged to be concealed by said transducer housing when said members are telescoped and to be exposed when said housing is only partially withdrawn from said tone arm, whereby said plug may be forced from within said recess by means of an implement inserted through the opening in said transducer housing.

2. In a phonograph tone arm assembly, the combination of telescoping male and female members, said male member comprising a channel-shaped transducer housing and said female member comprising an open-ended channel-shaped tone arm, said male member being supported within said female member for relative axial movement, a plurality of parallel electrical contacts positioned in each of said members and adapted for engagement when said members are axially interfitted, interlocking pin and receptacle means for holding said members in interfitted relationship, a transducer positioned within and supported by said transducer housing, means providing a transverse recess in said transducer, said recess having a transverse opening aligned with a corresponding opening in said transducer housing, a pin arranged to be inserted into said recess, friction means for retaining said pin within said recess, and a phonograph stylus supported by said pin, said respective openings being arranged to be concealed by said transducer housing when said members are telescoped and to be exposed when said housing is only partially withdrawn from said tone arm, whereby said pin may be forced from within said recess by means of an implement inserted through the opening in said transducer housing.

CARROLL R. MINER.

REFERENCES CITED

The following references are of record in the file of this patent:

UNITED STATES PATENTS

| Number | Name | Date |
|---|---|---|
| 739,303 | Gleason | Sept. 22, 1903 |
| 904,453 | Rodenberger | Nov. 17, 1908 |
| 1,570,297 | Dyer | Jan. 19, 1926 |
| 1,905,669 | Yenzer | Apr. 25, 1933 |
| 1,905,723 | Landsman | Apr. 25, 1933 |
| 1,918,972 | King | July 18, 1933 |
| 2,032,194 | Wiebusch | Feb. 25, 1936 |
| 2,147,092 | Dudeck | Feb. 14, 1939 |
| 2,320,427 | Guedon | June 1, 1943 |

FOREIGN PATENTS

| Number | Country | Date |
|---|---|---|
| 602,261 | Great Britain | May 24, 1948 |
| 2,055,187 | Vieth | Sept. 22, 1936 |